US 6,718,105 B2

(12) United States Patent
Hasegawa et al.

(10) Patent No.: US 6,718,105 B2
(45) Date of Patent: Apr. 6, 2004

(54) OPTICAL FIBER (75) Inventors: Takemi Hasegawa, Yokohama (JP); Eisuke Sasaoka, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 13 days.

(21) Appl. No.: 09/790,986

(22) Filed: Feb. 23, 2001

(65) Prior Publication Data
US 2001/0031118 A1 Oct. 18, 2001

Related U.S. Application Data
(60) Provisional application No. 60/246,726, filed on Nov. 9, 2000.

(30) Foreign Application Priority Data
Feb. 23, 2000 (JP) ........................ 2000-046254

(51) Int. Cl.$^7$ ................................. G02B 6/02
(52) U.S. Cl. ........................................ 385/123
(58) Field of Search ................. 385/116, 120, 385/124, 126, 127, 123

(56) References Cited
U.S. PATENT DOCUMENTS

| 5,802,236 | A | | 9/1998 | DiGiovanni et al. |
| 5,881,195 | A | * | 3/1999 | Walker .................. 385/116 |
| 6,243,520 | B1 | * | 6/2001 | Goldman ................ 385/115 |
| 6,301,420 | B1 | * | 10/2001 | Greenaway et al. ....... 385/126 |
| 6,301,421 | B1 | * | 10/2001 | Wickham et al. ......... 385/126 |
| 6,334,017 | B1 | * | 12/2001 | West ..................... 385/123 |

FOREIGN PATENT DOCUMENTS

| EP | 0 905 834 A | 3/1999 |
| WO | WO 00/37974 | 6/2000 |

OTHER PUBLICATIONS

"Endlessly Single–Mode Photonic Crystal Fiber," by Birks et al., Optics Letters, vol. 22, No. 13 (Jul. 1, 1997), pp. 961–963.
"All–Silica Single–Mode Optical Fiber with Photonic Crystal Cladding: Errata," by Knight et al., Optics Letters, vol. 22, No. 7 (Apr. 1, 1997), pp. 484–485.
"All–Silica Single–Mode Optical Fiber with Photonic Crystal Cladding," by Knight, et al., Optics Letters, vol. 21, No. 19 (Oct. 1, 1996), pp. 1547–1549.
"Distribution of Spontaneous Emission from an ER3+ –Doped Photonic Crystal Fiber", Cregan et al., Journal of Lightwave Technology, IEEE. New York, US, vol. 17, No. 11, Nov. 1999, pp. 2138–2141, XP001033280.

* cited by examiner

Primary Examiner—Javaid H. Nasri
Assistant Examiner—Thanh-Tam Le
(74) Attorney, Agent, or Firm—McDermott, Will & Emery

(57) ABSTRACT

In an optical fiber including a core region and a cladding region surrounding said core region in a cross section and having a cross-sectional structure in which a plurality of regions constituted by sub mediums are arranged in main mediums, at least one of refractive indices of the main mediums and the sub mediums are changed in a radial direction.

5 Claims, 5 Drawing Sheets

OPTICAL FIBER

CROSS-REFERENCE TO RELATED APPLICATION

This application claims priority to Provisional Application Ser. No. 60/246,726 filed Nov. 9, 2000, which is/are hereby incorporated by reference in its/their entirety.

BACKGROUND OF THE INVENTION

1. Field of the Invention

The present invention relates to an optical fiber which can be suitably used as an optical transmission path and a dispersion compensator.

2. Description of the Related Art

Figure 10:
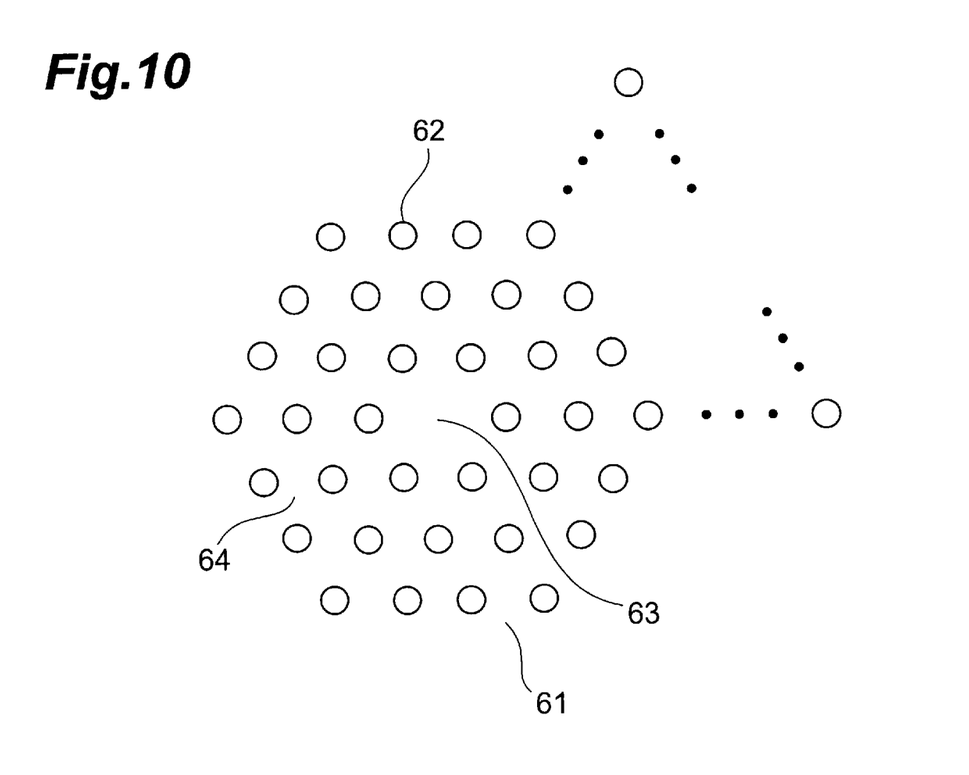
FIG. 10 is a cross-sectional view of a conventionally known optical fiber having microstructures.

FIG. 10 is a cross-sectional view of an optical fiber including microstructures which has been known conventionally. As shown in FIG. 10, this optical fiber has a cross-sectional structure which has a large number of voids (vacant holes) 62 in a material made of silica glass 61. A central portion in cross section having no voids 62 constitutes a core region 63 and a portion surrounding the core region 63 and including a large number of the voids 62 constitutes a cladding region 64.

The principle of optical confinement of the optical fiber including such microstructures is explained using a concept called effective refractive indices qualitatively (for example, T. A. Birks et al. Optics Letters Vol. 22 p.961 (1997)). Due to the presence of the microstructures, in a strict sense, the refractive index should exhibit a complicate distribution in the core region 63 and the cladding region 64. However, on the assumption that the optical waveguiding characteristics can be approximated by replacing each region with a homogeneous medium, the refractive index of this uniform medium is called the effective refractive index. The effective refractive indices $n_{eff}$ satisfy a following equation.

$$\left(\frac{f_1}{n_1^2} + \frac{f_2}{n_2^2}\right)^{-1} \leq n_{eff}^2 \leq f_1 n_1^2 + f_2 n_2^2 \quad (1)$$

where, n is the refractive index and f is the volume fraction. Further, a suffix 1 represents silica glass and a suffix 2 represents air. With respect to the volume fraction, $f_1+f_2=1$ holds. Usually, since $n_1>n_2$, the both side members in the equation (1) become smaller corresponding to the increase of $f_2$. Accordingly, the effective refractive index of the cladding region 64 including a large number of voids 62 becomes smaller than the effective refractive index of the core region 63 so that the light confinement is realized in the same manner as in the usual optical fiber.

Such a model of the effective refractive indices is considered to be reasonable in a case that the light wavelength is long compared to the scale of the microstructure. However, as the light wavelength becomes shorter, the light is locally concentrated at portions having the high refractive index and hence, although the effective refractive indices are elevated, simultaneously, it is considered that the assumption that the structure having the refractive index distribution can be replaced by the uniform mediums will lose the validity.

On the other hand, an optical fiber having a greater negative dispersion than such an optical fiber is disclosed in U.S. Pat. No. 5,802,236, for example. Although this optical fiber has the above-mentioned microstructures, the optical fiber is characterized in that a cladding region is constituted by an inner cladding region and an outer cladding region and the inner cladding region has the effective refractive index which is smaller than the effective refractive index of the outer cladding region.

A method for fabricating optical fibers having the above-mentioned microstructures is disclosed in Optics Letters Vol. 21 p. 1547–1549 (1996), for example. That is, a silica tube is ground such that an outer diameter becomes a hexagonal column and then the fiber is drawn to prepare a silica capillary tube and the silica capillary tubes are bundled in a hexagonal lattice arrangement to form a tube bundle. Here, the capillary tube disposed at the center of the bundle is replaced with a silica rod having no voids so as to form a core. An optical fiber having microstructures is obtained by drawing such a tube bundle.

Here, it is known that, at the time of drawing an optical fiber having such microstructures, the relative void diameter, i. e. the void diameter relative to the fiber dimension, shrinks due to the influence of the surface tension. To cope with this phenomenon, in the above-mentioned U.S. Pat. No. 5,802,236, a method in which one end of the voids extending along its axis is sealed and the fiber is drawn from the other end thereof so as to elevate the inner pressure of the voids is disclosed.

Further, in the above-mentioned Optics Letters, a technique to control the relative void diameter by controlling the temperature of a furnace at the time of fiber drawing is disclosed.

SUMMARY OF THE INVENTION

The optical fiber having microstructures is provided with various characteristics such as a large effective core area, a low bending loss or the like in response to the distribution of the microstructures in the core region or the cladding region. To determine the characteristics of the optical fiber in response to the distribution of microstructures, it is necessary that the mean refractive index distribution in cross section can be determined as desired. Further, to obtain the characteristics such as the large dispersion or the like, it is necessary to broaden the range of the value of the mean refractive index which can be realized. However, the prior art has following problems.

To realize the mean refractive index distribution by controlling the void diameter, it is necessary to form a structure where a plurality of voids having different diameters are present in the same cross section of a fiber. However, whichever method is selected from a method for sealing one end of voids and a method for controlling a furnace temperature, with respect to a plurality of voids having different diameters, it is difficult to realize the state that the diameters of respective voids have desired values. This is because the relative void diameter changes during fiber drawing and the amount of the change depends on the initial value of the relative void diameter in addition to the fiber drawing conditions. For example, the surface tension, which decreases the diameter of the voids, increases corresponding to the decrease in the void diameter. In such a conventional method, it is necessary to design the distribution of the void diameter in cross section of the preform such that the distribution of the void diameter in cross section of the fiber after fiber drawing becomes a given distribution. Such a design requires knowledge on the dependency of the change amount of the relative void diameter on its initial value and fiber drawing conditions. Accordingly, the method is extremely time-consuming and cumbersome.

Further, although the mean refractive index of the region including a microstructure is a function of the ratio between the inner diameter and the outer diameter of the silica capillary tube constituting the microstructure, it is difficult to prepare a silica capillary tube which has an extremely large or small ratio between the inner diameter and the outer diameter. Accordingly, the range of value of the mean refractive index which can be realized is also limited. When the ratio of the inner diameter to the outer diameter of the silica capillary tube is large, the strength of the capillary tube is reduced and hence, it is difficult to form voids without generating ruptures. Further, when the ratio of the inner diameter to the outer diameter is small, a fine boring instrument becomes necessary and this pushes up the fabrication cost.

Further, in controlling the void diameter, it is necessary to prepare a plurality of boring instruments corresponding to a plural kinds of void diameters and this becomes a cause of the increase of the fabrication cost.

Further, in performing the fusion splice of the optical fiber having microstructures with another optical fiber, there is a possibility that in the vicinity of an end surface of the optical fiber, the material composing the fiber is fused and hence, voids are collapsed. Since the difference in the effective refractive index between the core region and the cladding region decreases at portions where the voids are collapsed and hence, the light confinement into the core region is weakened and the light leaks to the outside of the core region so that the fusion splice loss is remarkably increased.

The present invention has been made in view of the above circumstances to provide an optical fiber which can facilitate the fabrication of optical fibers and the splice with other fibers and can make abroad range of mean refractive index available.

To achieve the above, in an optical fiber according to the present invention where the optical fiber consisting of a core and a cladding surrounding the core, and a plurality of regions constituted by sub mediums having refractive indices different from the refractive indices of the main mediums which constitute the core and the cladding are arranged in cross section, characterized in that at least one of refractive indices of the main mediums and the sub mediums are changed in a radial direction.

The main medium is made of a material which can constitute the optical fiber by itself such as silica glass, for example, and the sub medium is made of a material such as gas or liquid, for example, which cannot constitute the optical fiber by itself.

In the optical fiber having such structures, it becomes possible to adjust the mean refractive index of the region such that with the use of a material having a high refractive index as the main medium or the submedium, the mean refractive index of the region can be increased, while with the use of material having a low refractive index as the main medium or the sub medium, the mean refractive index of the region can be decreased. In the optical fiber according to the present invention, by a proper design of the refractive indices of the main mediums and the sub mediums, the mean refractive index distribution in cross section of the optical fiber can be formed without adjusting the areas of the sub mediums per unit cross-sectional area.

While the shapes of the sub-medium regions are liable to change unintentionally during the fiber drawing, the refractive indices of the materials hardly change. Accordingly, by adopting the constitution of the present invention, it becomes easy to realize a desired mean refractive index distribution in cross section of the drawn optical fiber compared with the prior art. Further, in the prior art which controls the void diameters, to increase the mean refractive index, the void diameters must be decreased. However, since there exists a limit in terms of processing technique with respect to the decreasing of the void diameters, the range of the mean refractive index which can be realized has been narrow. On the other hand, according to the present invention, the mean refractive index can be decreased by decreasing at least one of material refractive indices of the main mediums and the sub mediums, the mean refractive index can be increased by increasing those material refractive index whereby the range of the mean refractive index that can be realized can be broadened.

Further, by properly forming the distribution of refractive indices of the main mediums and the sub mediums in the radial direction, even when the voids are collapsed at the time of a fusion splice, due to the fusion of the material in the vicinity of an end surface of the optical fiber, the optical fiber can maintain the optical waveguiding characteristics. Accordingly, compared with a case where the refractive indices of the main medium and the sub medium are uniform in the radial direction as in the case of the prior art, it becomes possible to reduce the fusion splice loss so that the splicing operation is facilitated.

It is preferable that the refractive index of the main medium consisting the cladding region is changed in the redial direction. Further, it is preferable that the cross-sectional areas of the sub-medium regions are substantially uniform in the same transverse cross section. Due to such a constitution, it becomes possible to change the mean refractive index by using capillary tubes which have the equal ratio of an inner diameter and an outer diameter and different glass refractive indices in place of changing the mean refractive index by changing the ratio between an inner diameter and an outer diameter of the silica capillary tubes and hence, the requirement as to the number of the kinds of boring instruments can be alleviated and the fabrication cost can be reduced.

It is preferable that the arrangement of sub-medium regions is substantially equivalent to a hexagonal lattice or a quadratic lattice. This is because the fabrication of the optical fiber having such a structure is facilitated due to this arrangement and because particularly with respect to the quadratic lattice, the mean refractive index distribution can be easily set such that the mean refractive index distribution in cross section becomes substantially symmetric about the rotation of 90°.

BRIEF DESCRIPTION OF THE DRAWINGS

FIG. 3 to FIG. 7 are views respectively showing comparisons of calculated results of the waveguide dispersions and the effective core areas with respect to examples 1 to 7 and a comparison example, wherein FIG. 3 shows the comparison between the comparison example and the example 1; FIG. 4 shows the comparison between the comparison example and the example 2; FIG. 5 shows the comparison between the comparison example and the example 3; FIG. 6 shows the comparison between the example 2 and the example 4; and FIG. 7 shows the comparison between the example 5 and the example 6;

DESCRIPTION OF PREFERRED EMBODIMENTS

Embodiments of the present invention are explained in conjunction with attached drawings hereinafter. To facilitate the comprehension of the explanation, the same reference numerals denote the same parts, where possible, throughout the drawings, and a repeated explanation will be omitted. Further, the size ratio of respective drawings does not necessarily agree with the size ratio of the explanation of the Preferred Embodiments of the Invention.

Figure 1:
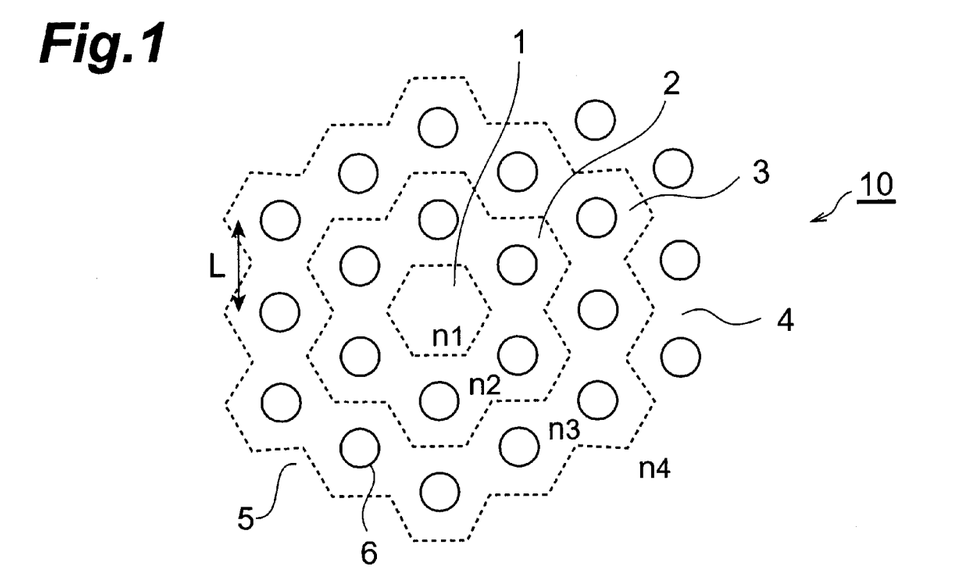
FIG. 1 is a view showing a center part of a cross section of a basic mode of an optical fiber according to the present invention.
Figure 2:
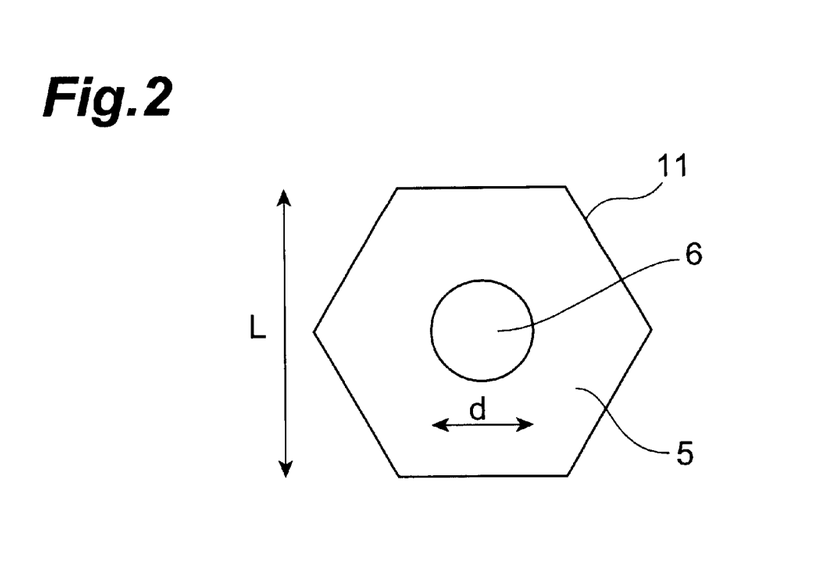
FIG. 2 is a cross-sectional view showing a unit cell of the optical fiber.

FIG. 1 is a transverse cross-sectional view showing a basic configuration of an optical fiber 10 according to the present invention and FIG. 2 is a view showing a unit cell 11 of the optical fiber 10. In this optical fiber 10, the cross section is divided into a first region 1, a second region 2 which surrounds the first region 1, a third region 3 which surrounds the second region 2 and a fourth region 4 which surrounds the third region 3 by a dotted line shown in FIG. 1. Although respective regions are made of silica glass 5 which constitutes a main medium and a plurality of voids 6 which constitute a sub medium, the refractive index of the silica glass 5 is not necessarily equal among respective regions. The refractive index of the silica glass 5 is set to $n_1$ in the first region 1, $n_2$ in the second region 2, $n_3$ in the third region 3 and $n_4$ in the fourth region 4.

The voids 6 are approximately circular in shape and their diameter d is all set to the equal value of d=0.4 L where L is a distance (pitch) between adjacent voids. As shown in FIG. 1, these voids 6 are arranged on lattice points of hexagonal lattices. Although no voids 6 are present in the first region 1 in the state shown in FIG. 1, it may be possible to adopt a mode in which the voids 6 are present in the first region 1. Further, here, the diameter of the voids 6 and the density of the voids 6 (the number of the voids 6 per unit cross-sectional area) are uniform in the cross section. However, the present invention is not limited to this and it may be possible to adopt a structure which suitably arranges voids 6 having different diameters or a structure which suitably changes the density of the voids in respective regions.

In the explanation discussed hereinafter, a concept called "mean refractive index" is used as a refractive index of each region. Since the effective refractive index is defined using an approximation, the definition is ambiguous and hence is not suitable for the description of the structures. Accordingly, this effective refractive index is not used. The microstructures are a set of a plurality of medium regions and it is assumed that the inside of each medium region is made of a homogeneous medium. The mean refractive index $n_{avg}$ is defined by a following equation provided that the microstructures are made of M kinds of mediums.

$$n_{avg} = \sqrt{\sum_{i=1}^{M} f_i n_i^2} \quad (2)$$

That is, the mean refractive index is the weighted RMS (Root Mean Square) of the refractive indices of respective mediums. Where, $n_i$ is the refractive index of the i-th medium and fi is the its volume fraction and a following equation holds.

$$\sum_{i=1}^{M} f_i = 1 \quad (3)$$

Due to this equation, the mean refractive index of each region is unambiguously determined.

The present invention is based on the finding that the formation of the mean refractive index distribution in cross section of the optical fiber can be also realized by the control of the refractive index of the material in addition to the control of the diameter of the voids 6. For example, in the optical fiber having microstructures which is constituted by the silica glass 5 and the voids 6, the refractive index of silica glass which constitutes the main medium is elevated by replacing the silica glass 5 constituting a unit cell 11 with silica glass doped with $GeO_2$ in a partial region of the optical fiber so that the mean refractive index of the region can be elevated.

Thus, when the refractive index of the silica glass 5 is increased, the mean refractive index of the unit cell 11 can be increased, while when the refractive index of the silica glass 5 is decreased, the mean refractive index of the unit cell 11 can be decreased. On the other hand, the mean refractive index of the unit cell 11 may be adjusted by setting the refractive index of silica glass 5 equals in each unit cell 11 and filling sub mediums different in the refractive index in the voids 6. Further, it may be possible to combine them.

In general, in the fiber drawing, although the shape of the material is liable to change, the refractive index of the material hardly changes. Accordingly, in the optical fiber of the present invention, it becomes easy to realize a desired mean refractive index distribution in the cross section of the drawn optical fiber compared with the prior art. Further, in the prior art which controls the void diameters, to increase the mean refractive index, the void diameters must be decreased. However, since there exists a limit in terms of processing technique with respect to the decrease of the void diameters, the range of the mean refractive index which can be realized has been narrow. To the contrary, according to the present invention, the mean refractive index can be decreased by decreasing at least one of material refractive indices of the main medium and the sub medium, and the mean refractive index can be increased by increasing those material refractive indices whereby the feasible range of the mean refractive index can be broadened.

Further, it becomes possible to change the mean refractive index by using capillary tubes which have the equal ratio between an inner diameter and an outer diameter and different glass refractive indices instead of changing the mean refractive index by changing the ratio between an inner diameter and an outer diameter of the silica capillary tubes which constitute the material of the unit cell 11. Accordingly, the number of the kinds of void diameters can be reduced and hence, the number of boring instruments which become necessary at the time of processing the silica capillary tubes can be minimized and the fabrication cost can be reduced.

Further, by properly forming the refractive index distribution of main medium and the sub medium in the radial direction, even when the voids are collapsed at the time of fusing due to the fusion of the material in the vicinity of an end surface of the optical fiber, the optical fiber can maintain the optical waveguiding characteristics. Accordingly, compared with a case where the refractive indices of the main medium and the sub medium are uniform in the radial direction as in the case of the prior art, it becomes possible to reduce the fusion splice loss.

The inventors have evaluated six kinds of optical fibers which differ in the refractive index distribution of silica glass 5 in the radial direction (hereinafter called "examples 1 to 6") and have compared them with a conventional optical fiber having a uniform refractive index of silica glass 5 (hereinafter called "comparison example") with respect to their characteristics. A result of the comparison is reported hereinafter.

In both of the optical fibers of these examples 1 to 6 and the optical fiber of the comparison example, the unit cells are arranged in the radial direction in nine layers. The examples 5, 6 are different from the examples 1 to 4 and the comparison example in that the first region 1 which constitutes the center is not provided with voids 6 therein with respect to the examples 1 to 4 and the comparison example, the first region is also provided with voids 6 having the same shape as those of other regions in the example 5, 6. The distribution of the refractive index $n_k$ of the silica glass 5 in the k-th region from the center in each example is set as shown in Table 1. In the comparison example, the refractive indices of respective regions are all set to the refractive index 1.444 of the pure silica glass.

TABLE 1

Refractive index distribution of silica glass in respective examples

| example | $n_1$ | $n_2$ | $n_3$ | $n_4$ to $n_9$ |
|---|---|---|---|---|
| 1 | 1.444 | 1.459 | 1.444 | 1.444 |
| 2 | 1.444 | 1.427 | 1.444 | 1.444 |
| 3 | 1.444 | 1.444 | 1.450 | 1.444 |
| 4 | 1.444 | 1.427 | 1.450 | 1.444 |
| 5 | 1.472 | 1.472 | 1.444 | 1.444 |
| 6 | 1.444 | 1.472 | 1.444 | 1.444 |

Thus, to increase the refractive indices of the silica glass 5 greater than 1.444, the silica glass may be doped with $GeO_2$, for example, while to decrease the refractive indices of the silica glass 5 lower than 1.444, the silica glass may be doped with an F element, for example.

The mean refractive index $n_{avg,k}$ of the unit cell shown in FIG. 2 is defined by a following equation. Here, the refractive index of the void 6 portion is set to $n_{hole}$.

$$n_{avg,k} = \sqrt{n_k^2 - \frac{\pi d^2}{2\sqrt{3} L^2} \times (n_k^2 - n_{hole}^2)} \qquad (4)$$

Since each region of each example is a set of the unit cells having the equal structures, the mean refractive index of each region is equal to the mean refractive index of the unit cell. Since the refractive index $n_{hole}$ equals 1 when air is filled in the inside of the void 6, the mean refractive index $n_{avg,k}$ of each region in each example and the comparison example can be expressed as described in Table 2.

Table 2: Mean refractive index distribution of examples and comparison example

| example | $n_{avg,1}$ | $n_{avg,2}$ | $n_{avg,3}$ | $n_{avg,4}$–$n_{avg,9}$ |
|---|---|---|---|---|
| comparison | 1.444 | 1.388 | 1.388 | 1.388 |
| example 1 | 1.444 | 1.402 | 1.388 | 1.388 |
| example 2 | 1.444 | 1.373 | 1.388 | 1.388 |
| example 3 | 1.444 | 1.388 | 1.394 | 1.388 |
| example 4 | 1.444 | 1.373 | 1.394 | 1.388 |
| example 5 | 1.413 | 1.413 | 1.388 | 1.388 |
| example 6 | 1.388 | 1.413 | 1.388 | 1.388 |

Here, the comparison example 1 is an optical fiber having a so-called homogeneous cladding structure where the first region is set as the core regions and the second to ninth regions are set as the cladding regions and the mean refractive index in the cladding region is substantially uniform in the radial direction. To the contrary, with respect to the optical fibers of the examples 1 to 4, although the first region functions as the core region and the second to ninth regions function as the cladding region, the mean refractive index in the cladding region is changed in the radial direction. In the examples 5 and 6, the first and second regions function as the core region and the third to ninth regions function as the cladding region. Although both examples adopt the homogeneous cladding structure, the mean refractive index is changed in the radial direction in the core region with respect to the example 6.

Figure 3:
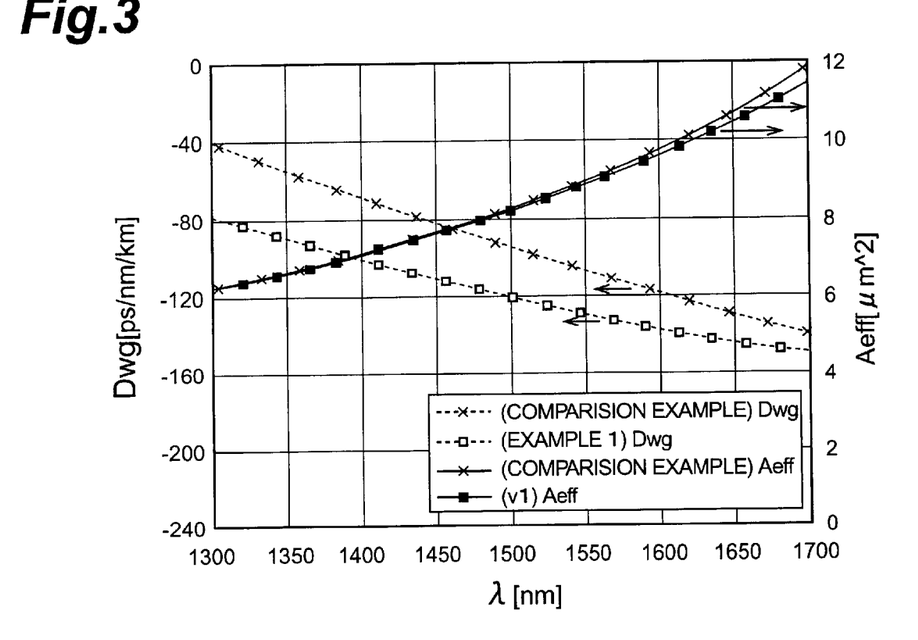

FIG. 3 shows the calculated result of the waveguide dispersion and the effective core area with respect to the comparison example and the example 1. In FIG. 3, the waveguide dispersion $D_{wg}$ is taken on the axis of left ordinates, the effective core area $A_{eff}$ is taken on the axis of right ordinates and the wavelength $\lambda$ of light is taken on the abscissa. In both the comparison example and the example 1, the dimensions are determined such that the effective core area $A_{eff}$ at the wavelength of 1550 nm becomes $A_{eff}=9\ \mu m^2$. The pitch L of the comparison example is set to L=1.46 $\mu$m and the pitch L of the example 1 is set to L=1.25 $\mu$m.

The example 1 has the large negative waveguide dispersion compared with the comparison example. Further, the example 1 has the small increment pace $d(A_{eff})/d\lambda$ of the effective core area to wavelength compared to the comparison example. The fact that the increment pace of the effective core area to wavelength is small means that the degree of light confinement to the core is high and hence, the bending loss is small. Further, in the comparison example, since the refractive index of silica glass which constitutes the main medium is uniform in the radial direction, when the voids are collapsed at the time of fusing, the optical guide characteristics is lost. However, in the example 1, even when the voids are collapsed, since the main medium of the second region has the high refractive index compared with the main mediums of the surrounding regions, the light is confined in the second region. Accordingly, the example 1 can realize the low fusion splice loss compared with the comparison example. That is, the optical fiber of this embodiment can elevate the mean refractive index of the second region compared with the homogeneous cladding structure and hence, it has been confirmed that the low bending loss, the large negative chromatic dispersion and the low fusion splice loss can be realized.

Figure 4:
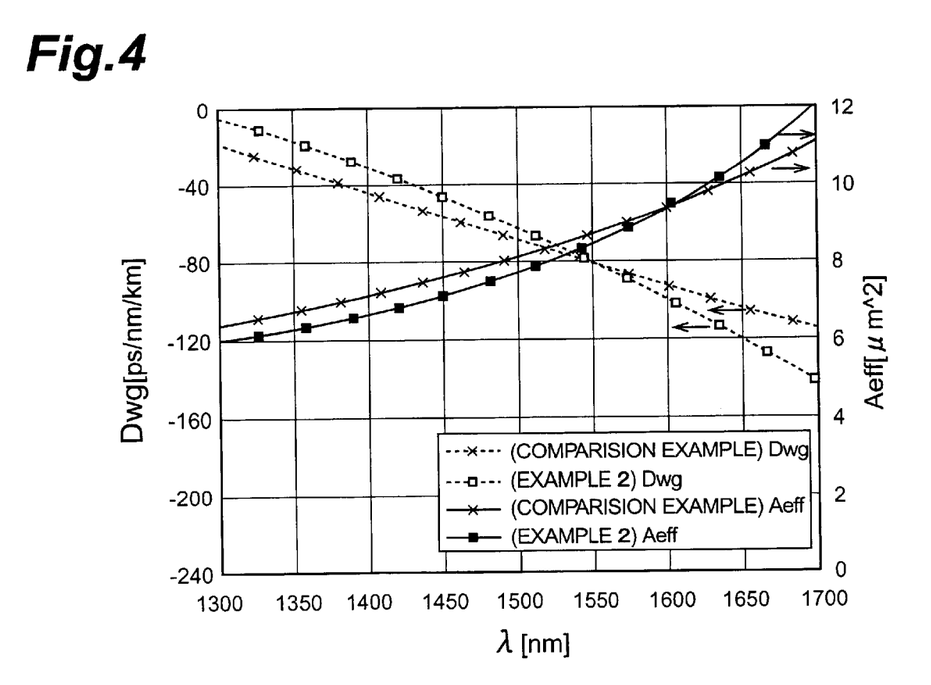

FIG. 4 shows a comparison of calculated results of the waveguide dispersion and the effective core area with respect to the comparison example and the example 2. Here, in both of the comparison example and the example 2, the respective dimensions are determined such that the waveguide dispersion $D_{wg}$ at the wavelength of 1550 nm becomes $D_{wg}=-80$ ps/nm/km. The pitch L of the comparison example is set to L=1.55 μm and the pitch L of the example 2 is set to L=1.73 μm.

The example 2 has the larger negative waveguide dispersion slope $S_{wg}$ than the comparison example. That is, the waveguide dispersion slope $S_{wg}$ is set to $S_{wg}=-0.23$ ps/nm²/km with respect to the comparison example and $S_{wg}=-0.40$ ps/nm²/km with respect to the example 2. Since the material dispersion of the silica glass at the wavelength of 1550 nm is 22 ps/nm/km and the slope of the silica glass at the wavelength of 1550 nm is 0.06 ps/nm²/km, in an approximate calculation, the chromatic dispersion of the example 2 becomes −58 ps/nm/km and the slope of the example 2 becomes −0.34 ps/nm²/km. Accordingly, the ratio of the slope to the dispersion value becomes −0.34/−58 nm⁻¹=−5.9×10⁻³ nm⁻¹. To also obtain the chromatic dispersion, the slope and the ratio of the slope to the dispersion with respect to the comparison example, they respectively become −58 ps/nm/km, −0.17 ps/nm²/km and −2.9×10⁻³ nm⁻¹. Assuming that the typical values of the chromatic dispersion, the slope and the ratio between the slope and the dispersion of a NZDSF (Non-Zero Dispersion Shifted Fiber) are respectively 5 ps/nm/km, 0.06 ps/nm²/km and 1.2×10⁻² nm⁻¹, the slope compensation rate for compensating for the dispersion of the NZDSF respectively becomes 24% and 49% with respect to the comparison example and the example 2. Here, the slope compensation rate is a ratio of the slope/dispersion ratio of the negative dispersion fiber to the slope/dispersion ratio of the positive dispersion fiber and as the slope compensation rate approaches 100%, the dispersion can be compensated in a broader wavelength band and hence, the broader transmission band can be realized. Accordingly, it is appreciated that the example 2 is more suitable as the dispersion compensation fiber of the NZDSF than the comparison example.

Further, at a long wavelength greater than the wavelength of 1550 nm, the example 2 exhibits the larger negative dispersion than the comparison example. For example, although the waveguide dispersion at the wavelength of 1625 nm is −98 ps/nm/km with respect to the comparison example, the waveguide dispersion of −109 ps/nm/km can be realized at the wavelength of 1625 nm with respect to the example 2. Since the material dispersion of the silica glass at the wavelength of 1625 nm is +27 ps/nm/km, it is envisaged that while the chromatic dispersion is −71 ps/nm/km with respect to the comparison example, the chromatic dispersion becomes −82 ps/nm/km with respect to the example 2. Further, the mode birefringence at the wavelength 1550 nm is 8.1×10⁻⁵ with respect to the example 2 and hence is sufficiently small. This is because that the mean refractive index distribution of the example 2 is substantially unchanged or steady to the rotation of 90 degrees. Since the mode birefringence is small, the polarization mode dispersion also becomes small.

That is, compared with the optical fiber having the homogenous cladding structure, by decreasing the mean refractive index of the second region, the large chromatic dispersion to negative and the large chromatic dispersion slope to negative can be realized and hence, it becomes possible to obtain the characteristics suitable for the dispersion compensation of the NZDSF. Further, by designing the optical fiber such that the mean refractive index distribution in cross section becomes substantially unchanged to the rotation of 90 degrees, the mode birefringence and the polarization mode dispersion can be reduced so that the characteristics suitable for the optical communication of a high bit rate can be obtained.

Figure 5:
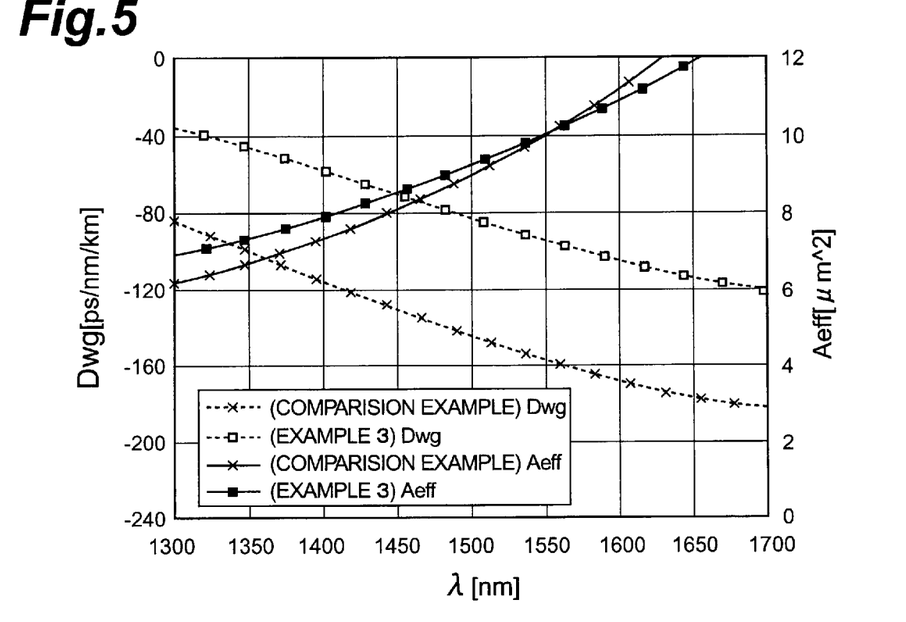

FIG. 5 shows a comparison of calculated results of the waveguide dispersion and the effective core area with respect to the comparison example and the example 3. In both of the comparison example and the example 3, respective dimensions are determined such that the effective core area $A_{eff}$ at the wavelength of 1550 nm becomes $A_{eff}=10$ μm². The pitch L is set to L=1.32 μm with respect to the comparison example and L=1.51 μm with respect to the example 3.

The example 3 has the smaller increment pace $dA_{eff}/d\lambda$ of the effective core area $A_{eff}$ to wavelength at the wavelength of 1550 nm than the comparison example. The fact that the increment pace of the effective core area $A_{eff}$ to wavelength is small means that the sensitivity to the fluctuation of the structural parameters is small and the degree of light confinement to the core is favorable and further the bending loss is small. Further, the fact that the bending loss is small means that the larger effective core area $A_{eff}$ can be realized provided that the bending loss is equal.

Accordingly, it has been confirmed that by elevating the mean refractive index of the third region compared with the optical fiber having the homogeneous cladding structure, the large effective core area and the low bending loss can be realized.

Figure 6:
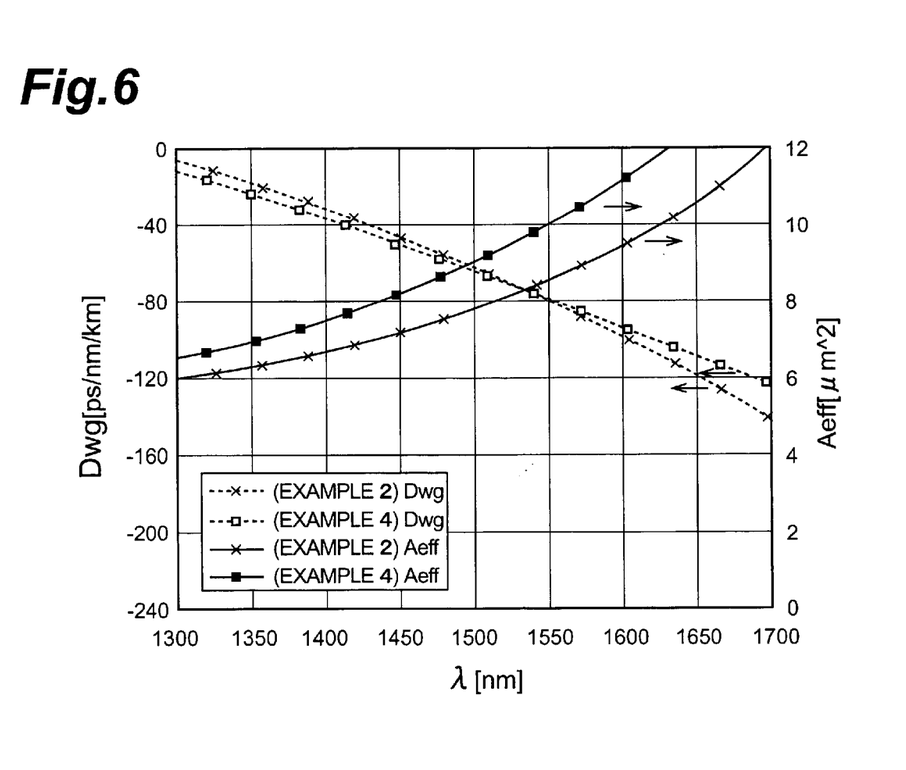

FIG. 6 shows a comparison of calculated results of the waveguide dispersion and the effective core area with respect to the examples 2 and 4. Here, in both examples 2 and 4, respective dimensions are determined such that the waveguide dispersion $D_{wg}$ at the wavelength of 1550 nm becomes $D_{wg}=-80$ ps/nm/km. The pitch L is set to L=1.73 μm with respect to the example 2 and L=1.76 μm with respect to the example 4.

The example 4 has the larger effective core area $A_{eff}$ at the wavelength of 1550 nm than the example 2. That is, it has been confirmed that by decreasing the mean refractive index of the second region compared with the optical fiber having the homogeneous cladding structure and further by increasing the mean refractive index of the third region, the low bending loss can be realized while ensuring the large waveguide dispersion to negative.

Figure 7:
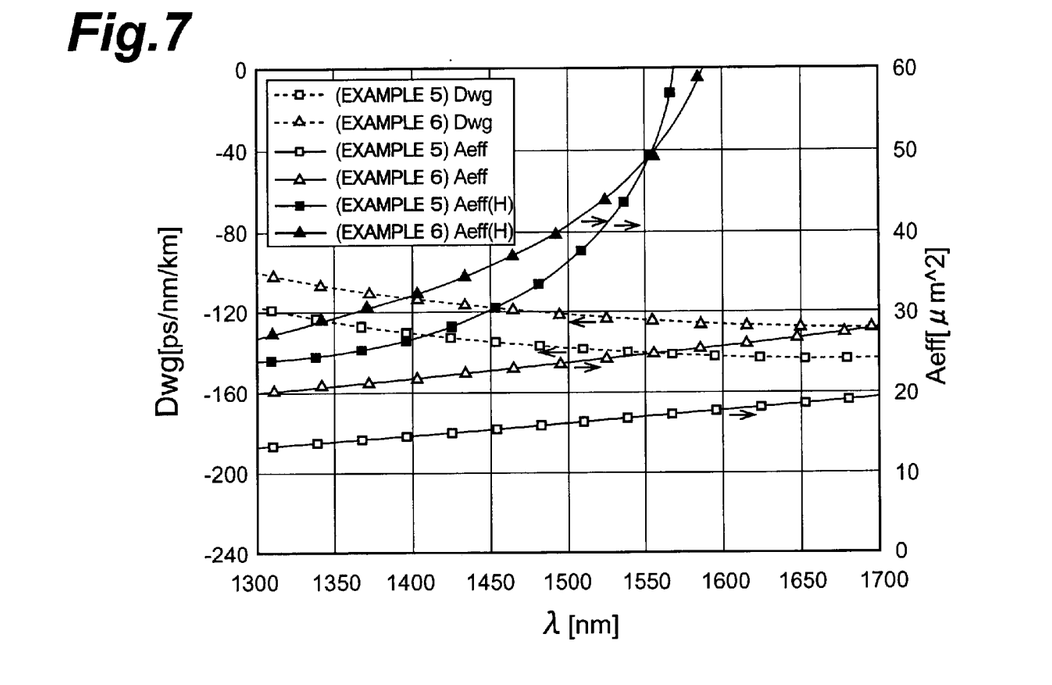

FIG. 7 shows a comparison of calculated results of the waveguide dispersion and the effective core area with respect to the examples 5 and 6. In both of the examples 5 and 6, respective dimensions are determined such that the higher mode, which is denoted by "(H)" in the legend of the figure, is cut off in the vicinity of the wavelength of 1550 nm. The pitch L is set to L=1.60 μm with respect to the example 5 and L=1.71 μm with respect to the example 6.

Although the example 5 corresponds to the homogeneous cladding structure, the example 6 has the large effective core area $A_{eff}$ compared with the example 5. To compare them at the wavelength of 1550 nm, the effective core area $A_{eff}$ is 16 μm² with respect to the example 5 while the effective core area $A_{eff}$ is 24 μm² with respect to the example 6.

Accordingly, it has been confirmed that by decreasing the mean refractive index of the center region in the inside of the core region in the homogeneous cladding structure, the large effective core area can be obtained.

Figure 8:
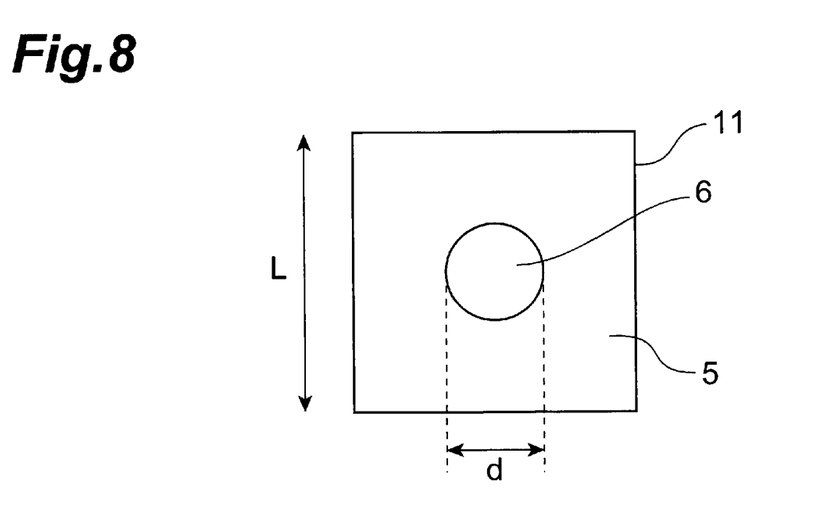
FIG. 8 is a cross-sectional view showing the structure of a unit cell of another embodiment of the optical fiber of the present invention.
Figure 9:
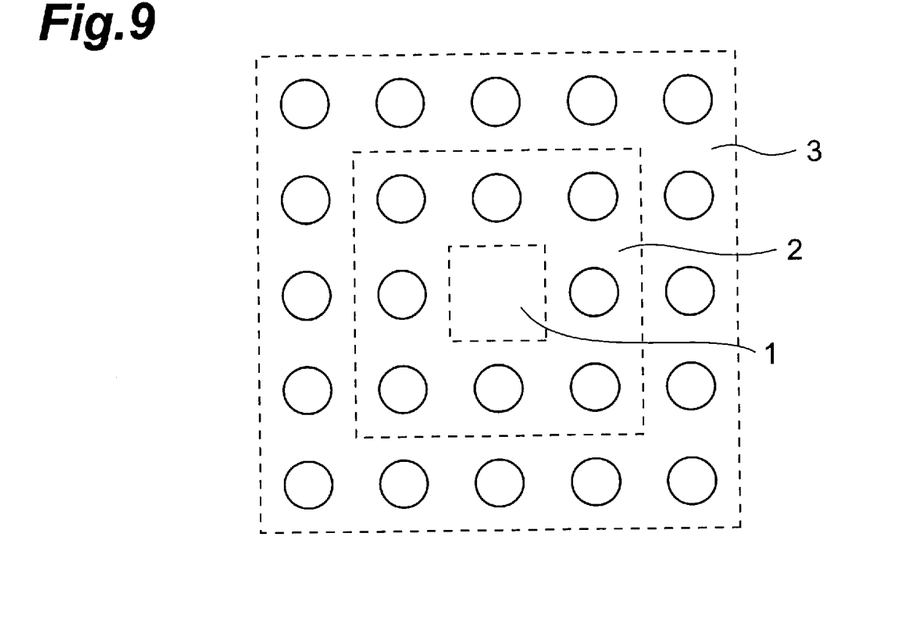
FIG. 9 is a center part of a cross-sectional view of showing a mode of an optical fiber in which these unit cells are arranged.

In the above-mentioned explanation, although the example in which the cross section of each unit cell 11 has the hexagonal structure and the cells 11 are arranged in a hexagonal lattice pattern, the cross section of each unit cell may take a square structure as shown in FIG. 8 or may be arranged in a square lattice pattern as shown in FIG. 9. Further, the cells may adopt various other arrangements including a staggered pattern.

What is claimed is:

1. An optical fiber consisting of m regions (where $3 \leq m$), each I-th region (where $1 < I \leq m$) surrounding the (I-i)-th region and contains main medium having refractive index $n_m(I)$, wherein j-th region and (j+1)-th region (where, $1 < j < m$) have a plurality of regions, arranged in main medium thereof, which consist of sub medium having a refractive index $n_s(k)$ different from $n_m(k)$ (where, k=j or j+1), and either or both of $n_m(j) \neq n_m(j+1)$ and $n_s(j) \neq n_s(j+1)$ hold, and at least one integer number L satisfies that the mean refractive index of the L-th region is lower than the total mean refractive index of a contiguous region from 1st to (L-l)-th region (where $1 < L \leq m$).

2. An optical fiber according to claim 1, wherein $n_m(j) \neq n_m(j+1)$ holds.

3. An optical fiber according to claim 2, wherein the arrangement of said regions constituted by said sub mediums is substantially equivalent to a hexagonal lattice or a quadratic lattice.

4. An optical fiber according to claim 2, wherein the cross-sectional areas of said regions constituted by said sub mediums are substantially uniform in the same transverse cross section.

5. An optical fiber according to claim 4, wherein the arrangement of said regions constituted by said sub mediums is substantially equivalent to a hexagonal lattice or quadratic lattice.

* * * * *